United States Patent
Cheng (10) Patent No.: US 7,596,270 B2
(45) Date of Patent: Sep. 29, 2009

(54) METHOD OF SHUFFLING TEXT IN AN ASIAN DOCUMENT IMAGE

(75) Inventor: Kuo-Young Cheng, Taichung Hsien (TW)

(73) Assignee: DynaComware Taiwan Inc., Taipei (TW)

( * ) Notice: Subject to any disclaimer, the term of this patent is extended or adjusted under 35 U.S.C. 154(b) by 653 days.

(21) Appl. No.: 11/234,709

(22) Filed: Sep. 23, 2005

(65) Prior Publication Data

US 2007/0071278 A1   Mar. 29, 2007

(51) Int. Cl.
- *G06K 9/34* (2006.01)
- *G06K 9/18* (2006.01)
- *H04K 1/00* (2006.01)
- *H04L 9/00* (2006.01)

(52) U.S. Cl. .................. 382/177; 382/171; 382/176; 382/185; 382/186; 380/28

(58) Field of Classification Search ................ 382/176, 382/177, 185, 186, 171
See application file for complete search history.

(56) References Cited

U.S. PATENT DOCUMENTS

| | | | | |
|---|---|---|---|---|
| 4,955,066 A | * | 9/1990 | Notenboom | 382/240 |
| 5,131,053 A | * | 7/1992 | Bernzott et al. | 382/176 |
| 5,185,813 A | * | 2/1993 | Tsujimoto | 382/180 |
| 5,202,933 A | * | 4/1993 | Bloomberg | 382/176 |
| 5,278,920 A | * | 1/1994 | Bernzott et al. | 382/176 |
| 5,412,729 A | * | 5/1995 | Liu | 380/37 |

(Continued)

FOREIGN PATENT DOCUMENTS

EP    516576 A2 * 12/1992

(Continued)

OTHER PUBLICATIONS

Deforges, O.; Barba, D., "A fast multiresolution text line and non text-line structures extraction and discrimination scheme for document image analysis," Image Processing, 1994. Proceedings. ICIP-94., IEEE International Conference, vol. 1, No., pp. 134-138 vol. 1, Nov. 13-16, 1994.*

(Continued)

*Primary Examiner*—Bhavesh M Mehta
*Assistant Examiner*—Gandhi Thirugnanam
(74) *Attorney, Agent, or Firm*—Christensen O'Connor Johnson Kindness PLLC (57) ABSTRACT

A method, system, and computer-readable medium containing computer-executable instructions are provided, for randomly relocating text character images of a scanned-in Asian character document to produce a shuffled image, wherein the meaning of text in the shuffled image is not understandable although individual characters forming the text in the shuffled image are recognizable. In one embodiment, the method includes generally four steps: (1) dividing an Asian character document image into a text image portion and a non-text image portion; (2) structuring the text image portion into a multiple resolution-level pyramid; (3) extracting shuffleable character images by analyzing the multiple-resolution-level pyramid; and (4) shuffling some or all of the extracted shuffleable character images to create a shuffled image. The shuffled (e.g., encoded) image can be reshuffled (e.g., decoded) back to the original text image portion of the Asian character document image, and combined with the non-text image portion to restore the Asian character document image.

7 Claims, 11 Drawing Sheets

U.S. PATENT DOCUMENTS

| | | | | |
|---|---|---|---|---|
| 5,430,808 | A | * | 7/1995 | Baird et al. ............ 382/176 |
| 5,539,827 | A | * | 7/1996 | Liu ........................ 380/37 |
| 5,588,072 | A | * | 12/1996 | Wang ..................... 382/176 |
| 5,647,021 | A | * | 7/1997 | Baird et al. ............ 382/176 |
| 5,774,580 | A | * | 6/1998 | Saitoh ................... 382/176 |
| 5,805,721 | A | * | 9/1998 | Vuylsteke et al. ...... 382/128 |
| 5,949,906 | A | * | 9/1999 | Hontani et al. ......... 382/177 |
| 6,396,503 | B1 | * | 5/2002 | Goss et al. ............. 345/582 |
| 6,701,015 | B2 | * | 3/2004 | Fujimoto et al. ....... 382/199 |
| 6,859,554 | B2 | * | 2/2005 | Porikli et al. .......... 382/173 |
| 7,190,839 | B1 | * | 3/2007 | Feather et al. ......... 382/240 |
| 2002/0110280 | A1 | * | 8/2002 | Prakash et al. ......... 382/240 |
| 2005/0069173 | A1 | * | 3/2005 | Morisada et al. ....... 382/103 |
| 2006/0085740 | A1 | * | 4/2006 | Ye et al. ................. 715/514 |
| 2007/0019886 | A1 | * | 1/2007 | Han ....................... 382/298 |
| 2007/0071278 | A1 | * | 3/2007 | Cheng .................... 382/100 |
| 2007/0116360 | A1 | * | 5/2007 | Jung et al. .............. 382/176 |
| 2007/0237401 | A1 | * | 10/2007 | Coath et al. ............ 382/232 |
| 2008/0002916 | A1 | * | 1/2008 | Vincent et al. .......... 382/305 |

FOREIGN PATENT DOCUMENTS

| EP | 567344 | A2 | * | 10/1993 |
|---|---|---|---|---|
| JP | 2004266428 | A | * | 9/2004 |

OTHER PUBLICATIONS

"Encryption of Text", "http://web.archive.org/web/20041126001759/http://www.colostate.edu/~pburns/projects/pjb_encryption.html" Nov. 26, 2004.*

Tan, C; Zhang, Z. "Text Block segmentation using pyramid structure", "www.comp.nus.edu.sg/labs/chime/da/paperdownload/tan01spieb.pdf", 2001.*

Chew Lim Tan; Bo Yuan; Weihua Huang; Qian Wang; Zheng Zhang, "Text/graphics separation using agent-based pyramid operations," Document Analysis and Recognition, 1999. ICDAR '99. Proceedings of the Fifth International Conference on , vol., No., pp. 169-172, Sep. 20-22, 1999.*

Furht, Borko et al. "An Overview of Modern Cryptography", Springer US, vol. 28, p. 31-51.*

Brun, M. et al. "Multi-resolution classification trees in OCR design", Oct. 2001, Computer Graphics and Image Processing, 2001 Proceedings of XIV Brazilian Symposium on, p. 59-66.*

Wu, Victor et al. "Finding Text in Images". In Proceedings of the 2nd ACM International Conference on Digital Libraries, 1997, p. 1-14.*

Pujari, Arun et al. "An Adaptive Character Recognizer for Telugu Scripts Using Multiresolution Analysis and Associative memory", 2002.*

Arun K. Pujari, C. Dhanunjaya Naidu, M. Sreenivasa Rao, B. C. Jinaga, An intelligent character recognizer for Telugu scripts using multiresolution analysis and associative memory, Image and Vision Computing, vol. 22, Issue 14, The Indian Conference on Vision, Graphics and Image Processing, Dec. 1, 2004, pp. 1221-1227.*

* cited by examiner

| 製　品　名 | 金額 |
|---|---|
| Truetype font　中太楷書体の使用権（5年間）<br>対象汎用機メーカー；富士通、日立、ＮＥＣ、ＩＢＭ（拡張文字も含む）<br>文字コード：　ＵＮＩＣＯＤＥ<br>文字数：内字を含め　３９８１６字 | ４００<br>万円 |

| 製　品　名 | 金額 |
|---|---|
| Truetype font　中太楷書体の使用権（5年間）<br>対象汎用機メーカー；富士通、日立、ＮＥＣ、ＩＢＭ（拡張文字も含む）<br>文字コード：　ＵＮＩＣＯＤＥ<br>文字数：内字を含め　39816字 | 400<br>万円 |

*Fig.10.*

以書下内番文書う。）下「すう）を書ォ「フの式関結覚む）の内字原条に数：供汎ＮＥ字
—カ富す額品０Ｅｏする。第容を書（の「る以株通り以条」下「機下Ｂ拡価）下約追加ア
し、ダロ用立、士一字機る。ＯＵＤ約以書」算の甲」本ントう）及使Ｍ（文字権（５体楷ム
め五とる。第す以ゴ）Ｃ、一；文象通、金Trfue契約関し、とい第社（条」に五下「社（
康とは、「諾に第条」、含書諾の容関コ文をイウ提日ＮＩＩ追加約原号M00A8-01）」（び、
「関—用華し、以も第許条（含一ェ第ナメ３９８１６円４Cntet四の条に契契式三デ会計
タ乙）会計とい締一とい第張条（用年使使対契書株名を字内コド：万yp原太間）二用中
製対０

*Fig.11.*

METHOD OF SHUFFLING TEXT IN AN ASIAN DOCUMENT IMAGE

FIELD OF THE INVENTION

The present invention relates generally to document image analysis for security reasons, and more specifically to a method and system for shuffling an Asian-language document image to render it unreadable for an ordinary viewer.

BACKGROUND OF THE INVENTION

An Asian language document contains Asian characters, each of which is generally of a square block shape. Some Asian documents are confidential in nature, and thus it is desirable to provide a method and system for encoding or encrypting such documents.

In some situations, it is further desired that each individual character included in the Asian document, even after the document as a whole is encoded, is still recognizable or identifiable. For example, when a confidential Asian document is scanned into a computer, not all the characters included in the document may be correctly recognized due to limitations in OCR (Optical Character Recognition) software. Thus, a human operator may need to read the scanned-in and OCR-processed document to see if there is any wrongly-recognized (e.g., incomplete) character and, if so, manually replace it with a correct character by typing in the correct character.

The present invention is directed to addressing the need for encoding an Asian document, while maintaining each of the individual characters included in the document recognizable even after the document as a whole is encoded to thereby become unreadable.

SUMMARY OF THE INVENTION

A method, system, and computer-readable medium containing computer-executable instructions are provided, for randomly relocating text character images of a scanned-in Asian character document to produce a shuffled image, wherein the meaning of text in the shuffled image is not understandable although individual characters forming the text in the shuffled image are recognizable. In one embodiment, the method includes generally four steps: (1) dividing an Asian character document image into a text image portion and a non-text image portion; (2) structuring the text image portion into a multiple resolution-level pyramid; (3) extracting shuffleable character images by analyzing the multiple-resolution-level pyramid; and (4) shuffling some or all of the extracted shuffleable character images to create a shuffled image. The shuffled (e.g., encoded) image can thereafter be reshuffled (e.g., decoded) back to the original text image portion of the Asian character document image, and combined with the non-text image portion to thereby restore the Asian character document image.

In accordance with one aspect of the present invention, the step of dividing an Asian character document image into a text image portion and a non-text image portion further includes performing one or more sub-steps of: skew correction, noise removal, and non-character image finding.

In accordance with another aspect of the present invention, the step of structuring the text image portion into a multiple resolution-level pyramid further includes sub-steps of: (1) forming a multiple resolution-level pyramid having resolution levels ranging from $2^0 \times 2^0$ to $2^N \times 2^N$ where N is a positive integer; (2) finding all islands at each resolution level, wherein each island is associated with its attributes (e.g., the location and size); and (3) constructing a tree structure representing a nodal relationship between islands of adjacent resolution levels.

In accordance with yet another aspect of the present invention, the step of shuffling some or all of the extracted shuffleable character images to create a shuffled image further includes sub-steps of: (1) creating a plurality of holding spaces in computer memory; (2) randomly selecting the extracted shuffleable character images and placing them in the holding spaces; and (3) associating each shuffleable character image with attributes of island(s) forming the shuffleable character at the highest resolution level of $2^0 \times 2^0$.

In accordance with a still further aspect of the present invention, a computer-readable medium is provided for shuffling an Asian character document image to change its appearance so that the meaning of a resulting shuffled document image cannot be understood while individual characters contained in the shuffled document image are still recognizable. The computer-readable medium includes: (1) a data structure for organizing an Asian character document image in a multiple resolution-level tree, wherein the tree is formed from a multiple resolution-level pyramid of a text portion of an Asian character document image; and (2) a data structure for shuffling and reshuffling the text portion of the Asian character document image.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

Figure 9:
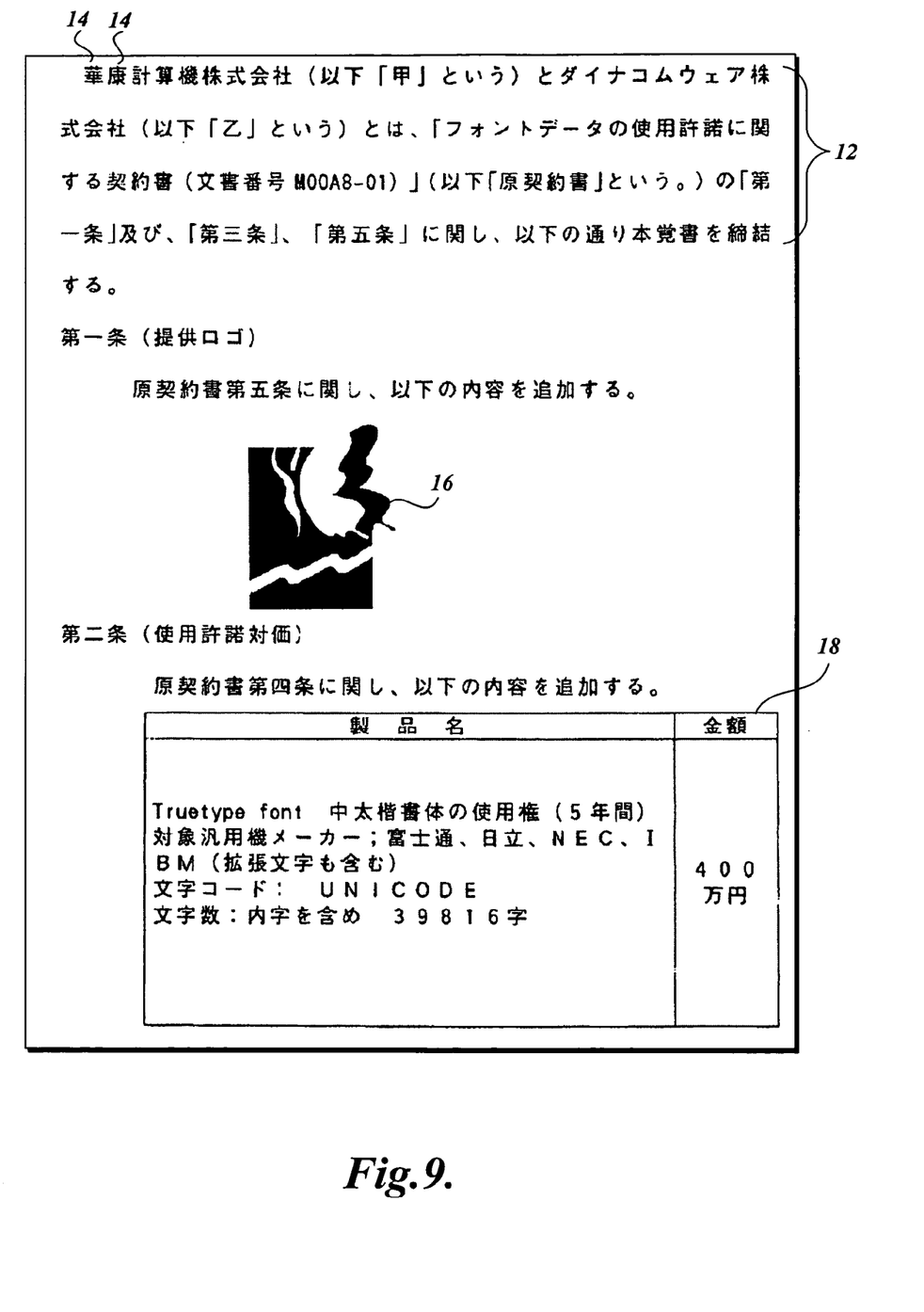
FIG. 9 is a sample Asian character document, which may be scanned in and shuffled according to a method of the present invention.

The text in an Asian document, such as the document shown in FIG. 9, consists of lines 12, with each line 12 in turn consisting of a plurality of Asian characters 14. Each Asian character is generally of a square block shape. Though each Asian character has its own meaning, one cannot understand Asian text unless a plurality of Asian characters are arranged in a meaningful sentence. Thus, if the characters from two different sentences are shuffled (e.g., if the first, third, and fifth characters of the first sentence are exchanged with the first, third, and fifth characters of the second sentence), a reader can no longer understand the meaning of either the first or second sentence, even though the reader could still recognize the individual Asian characters forming these sentences. In other words, if an Asian document is shuffled, then a reader can still recognize individual Asian characters contained therein, but the meaning of the document will be completely lost. This becomes particularly true if shuffling is performed multiple times.

The Asian document image shuffling method according to the present invention may be particularly useful in the case when a classified or proprietary document needs to be processed (e.g., typed) by an outside party. In such a case, a classified document can be scanned and shuffled, so that the shuffled document with new sentences (which are no longer understandable) can be sent, for example, through a network connection to an outside party. At this time, the outside party can still recognize all of the individual characters included in the shuffled document so as to perform, for example, typing a correct character to replace a wrong (e.g., incomplete) character that may have been incorrectly recognized due to limitations in OCR software. The outside party can perform such task because each individual character is visually recognizable and identifiable, even though the meaning of the sentences is not understandable. Thereafter, the outside party sends the shuffled and further processed document back to the owner of the document. The owner can then reshuffle the document back to the original, understandable text.

Another application of the Asian document image shuffling method of the present invention is as a document encoding (or encrypting) method. When it is desired to protect a document from potential interception by an unauthorized party, the sender of the document can shuffle (i.e., encode) the document and send the shuffled document. The authorized receiver of the shuffled document then reshuffles (i.e., decodes) the document back to the original, understandable text.

The success of the Asian document image shuffling method of the present invention depends on how well individual characters can be separated for shuffling purposes so that the shuffled document, though not understandable, still consists of individual characters that are recognizable as such. In this connection, a difficulty arises because correctly separating (or demarcating) two or more Asian characters that appear next to each other is no small task in computer image processing.

Figure 1:
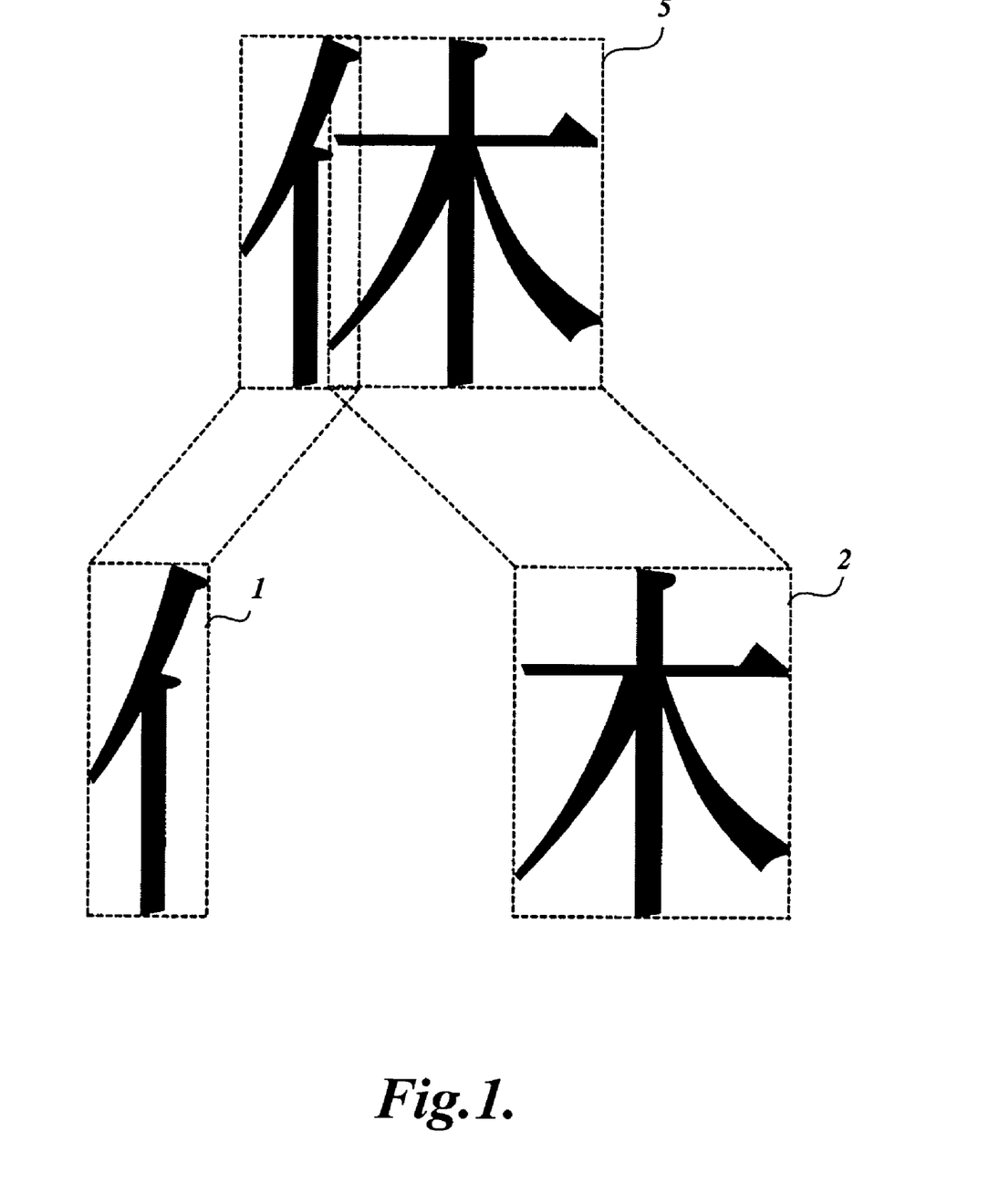
FIGS. 1-3 show Asian characters, respectively, each consisting of a plurality of glyphs.

Referring to FIG. 1, a Chinese character is shown in a box 5. As is typically the case with Chinese characters, this character consists of two glyphs, which are separated from each other and thus are included in two separate bounding boxes 1 and 2, respectively. Since this character is therefore recognized as two separate glyphs as contained in the bounding boxes 1 and 2 (as opposed to being correctly recognized as a single character contained in the box 5), these glyphs will be shuffled separately and consequently the resulting shuffled document will not include the correct character as originally included in the box 5.

Figure 2:
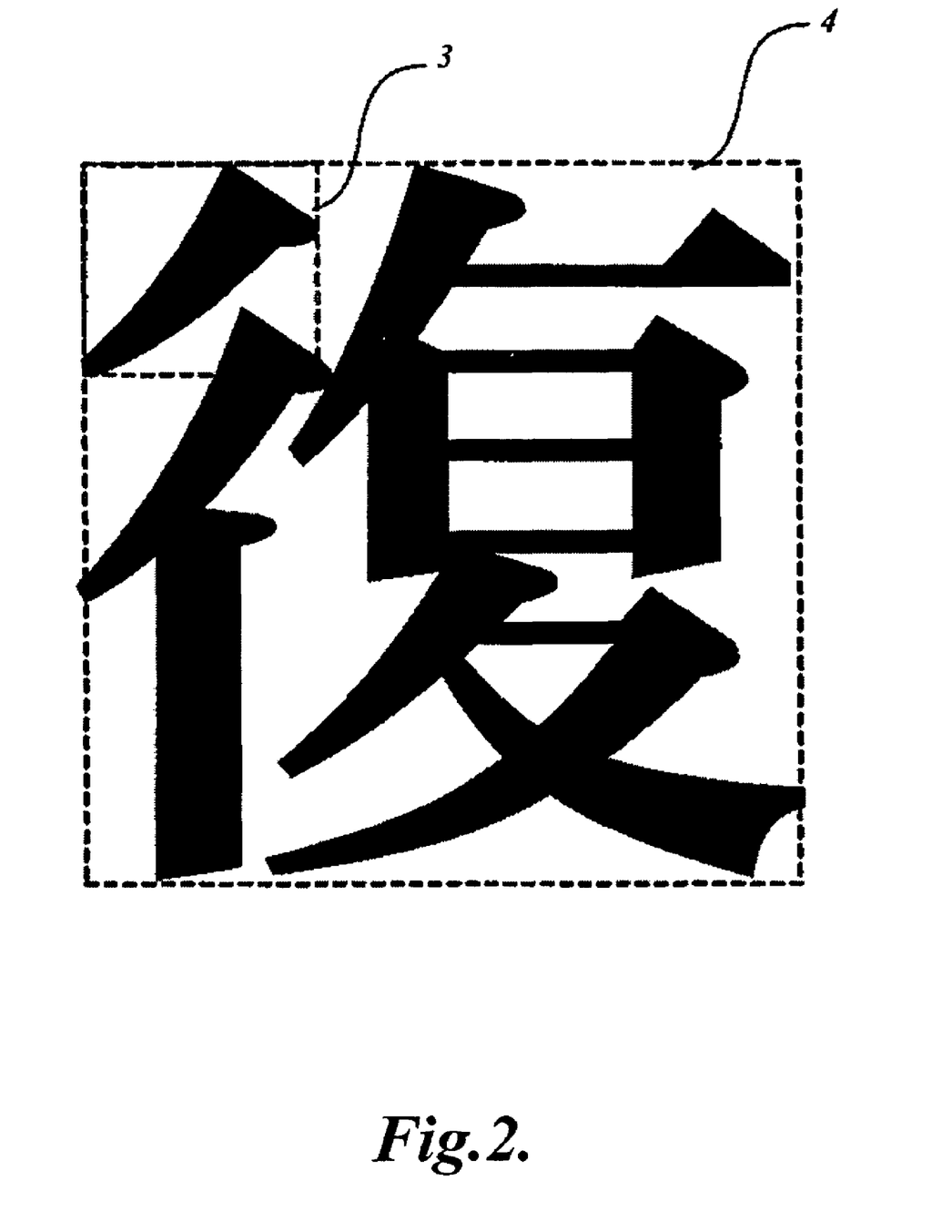
Figure 3:
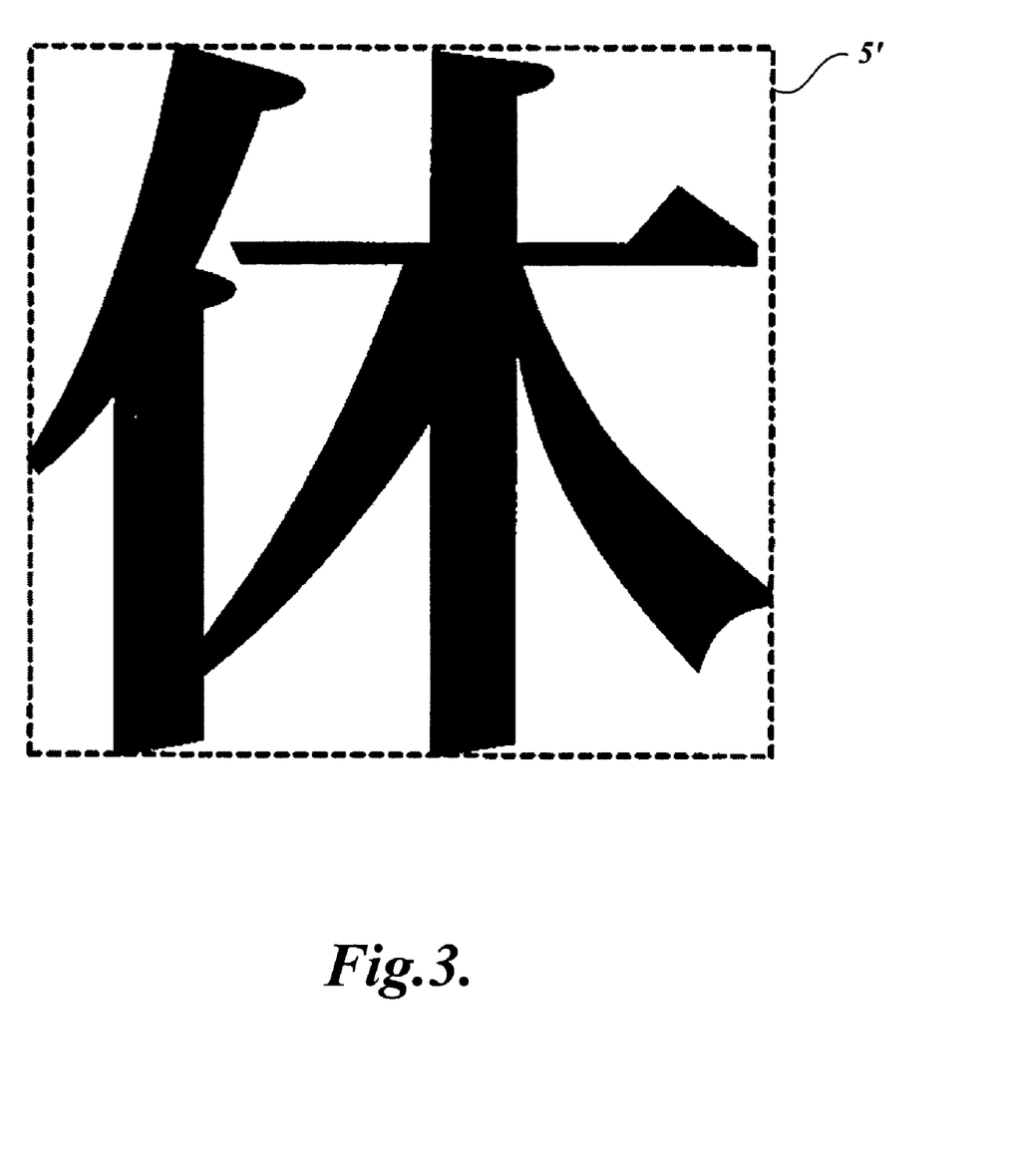

On the other hand, as shown in FIG. 2, if one bounding box 3 is included in another bounding box 4, then the larger bounding box (4, in this case) can be recognized as containing one character. Also, if there is no gap or separation between two or more glyphs forming a character, as shown in FIG. 3, then such is correctly recognized as one character. FIG. 3 shows the same Chinese character as the character included in the box 5 of FIG. 1, except that the character in the bounding box 5' of FIG. 3 has its two glyphs touching each other and thus these glyphs are not recognized as two separate elements. Therefore, there remains a need for a method for correctly identifying a character even when it consists of two or more separate glyphs, as in the case of FIG. 1.

Figure 4:
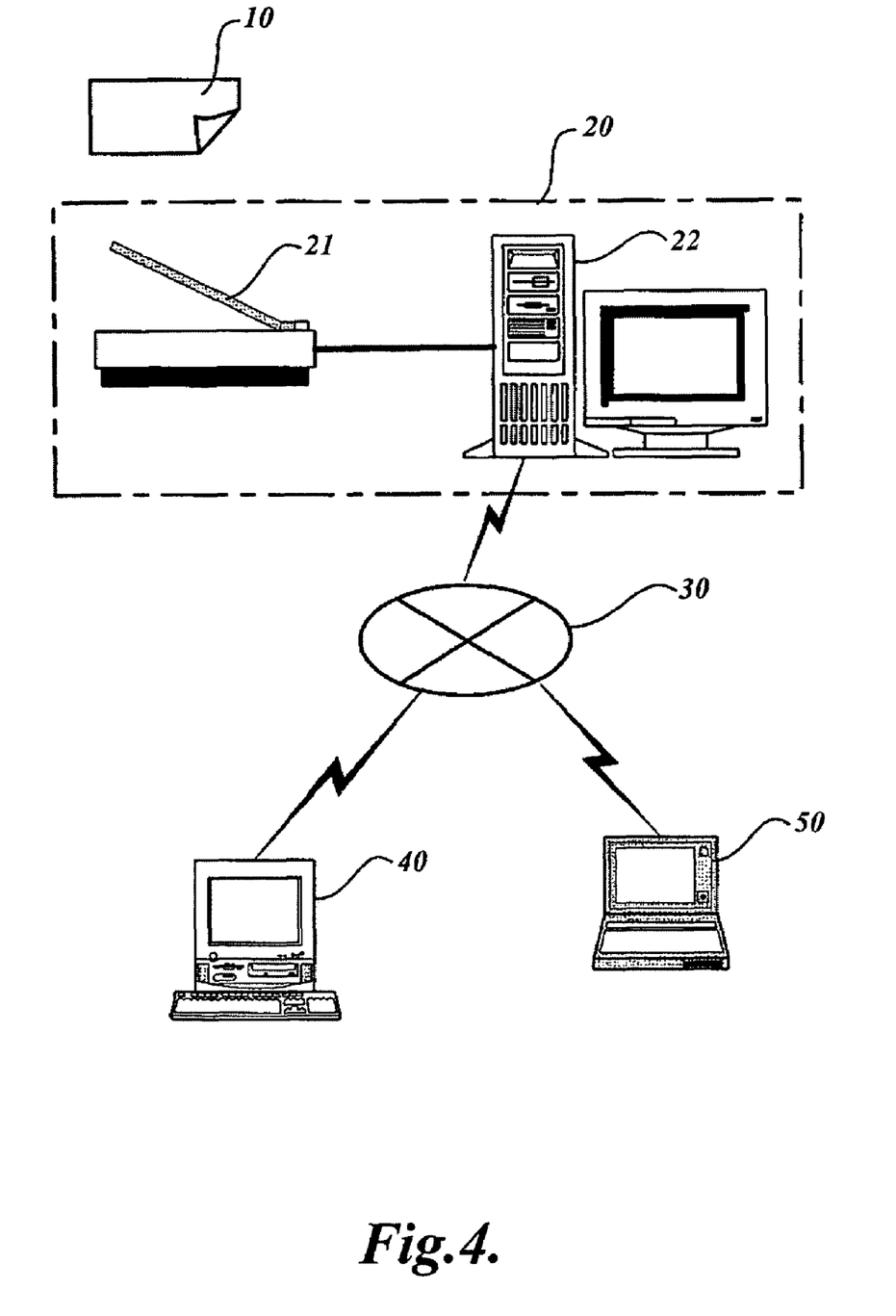
FIG. 4 is a block diagram depicting a system suitable for use in practicing a method of the present invention.

FIG. 4 illustrates a typical computing environment, in which various methods of the present invention may be implemented. An Asian character document on paper 10 is scanned in by an image scanner 21, as image data, into a general purpose digital computer 22. Other types of computing systems, such as networked or mainframe-based systems, may also be used to carry out methods of the present invention, as apparent to those skilled in the art. The Asian character document image data are then "shuffled" according to shuffling program instructions, which are stored in the computer 22 and will be described in detail below. The shuffled Asian character document image data are sent via a network 30 to a third party computer 40, which includes suitable OCR software. Using the OCR software, the third party computer 40 converts the shuffled Asian character document image data into editable text data. At this time, the third party computer 40 may further permit manual editing or correction of the text data. The text data are thereafter sent via the network 30 back to the original computer 22 and reshuffled so that the characters return to their original positions. In this embodiment, an Asian character image shuffling system 20 consists generally of the image scanner 21 and the computer 22.

In another application of the Asian character image shuffling system 20, an Asian character document 10 of confidential nature can be shuffled (i.e., encoded or encrypted) and sent to a receiver computer 50 via the network 30. In this application, the receiver computer 50 includes reshuffling program instructions to carry out reshuffling (i.e., decoding) of the received shuffled Asian character document image data so as to restore the original Asian character document image data. In other words, since reshuffling is possible only with the reshuffling program instructions, any unauthorized party without such reshuffling program instructions cannot decode (or understand) the shuffled Asian character document image data even if he/she can intercept such data on the network 30.

Figure 5:
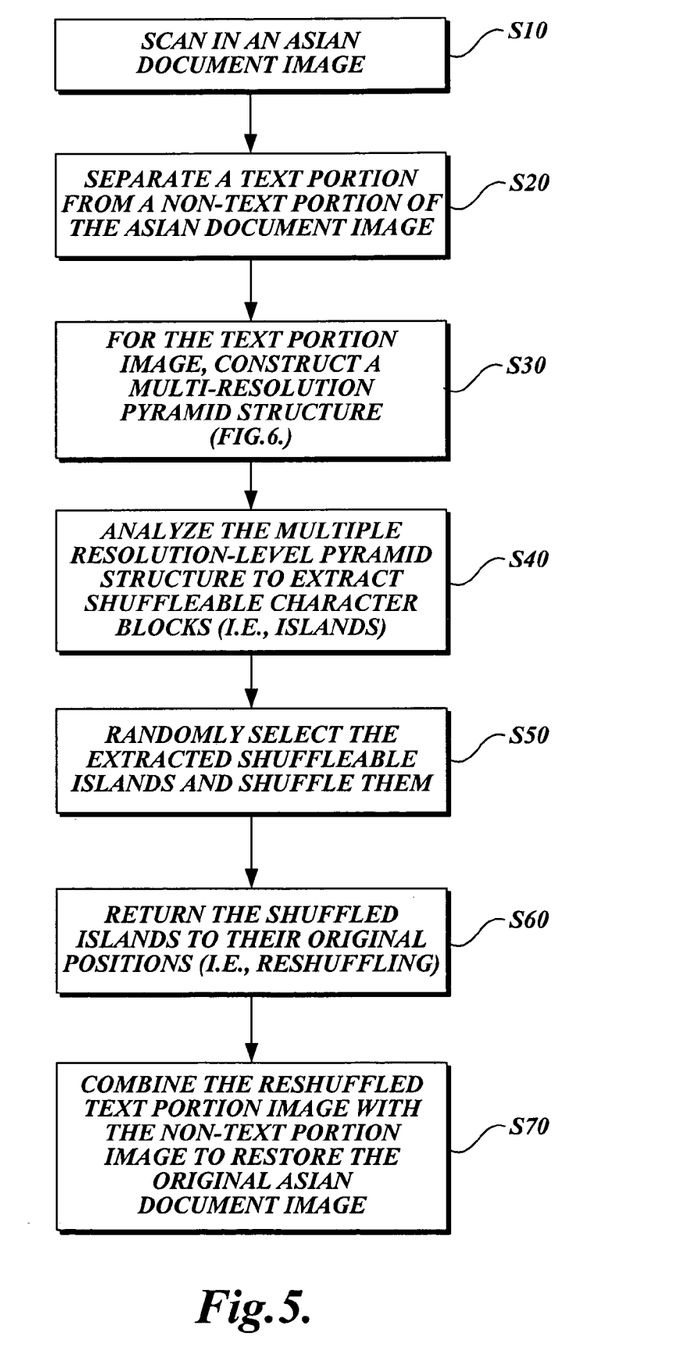
FIGS. 5 and 6 are flowcharts depicting various aspects of a method of shuffling an Asian document image according to one embodiment of the present invention.
Figure 10:
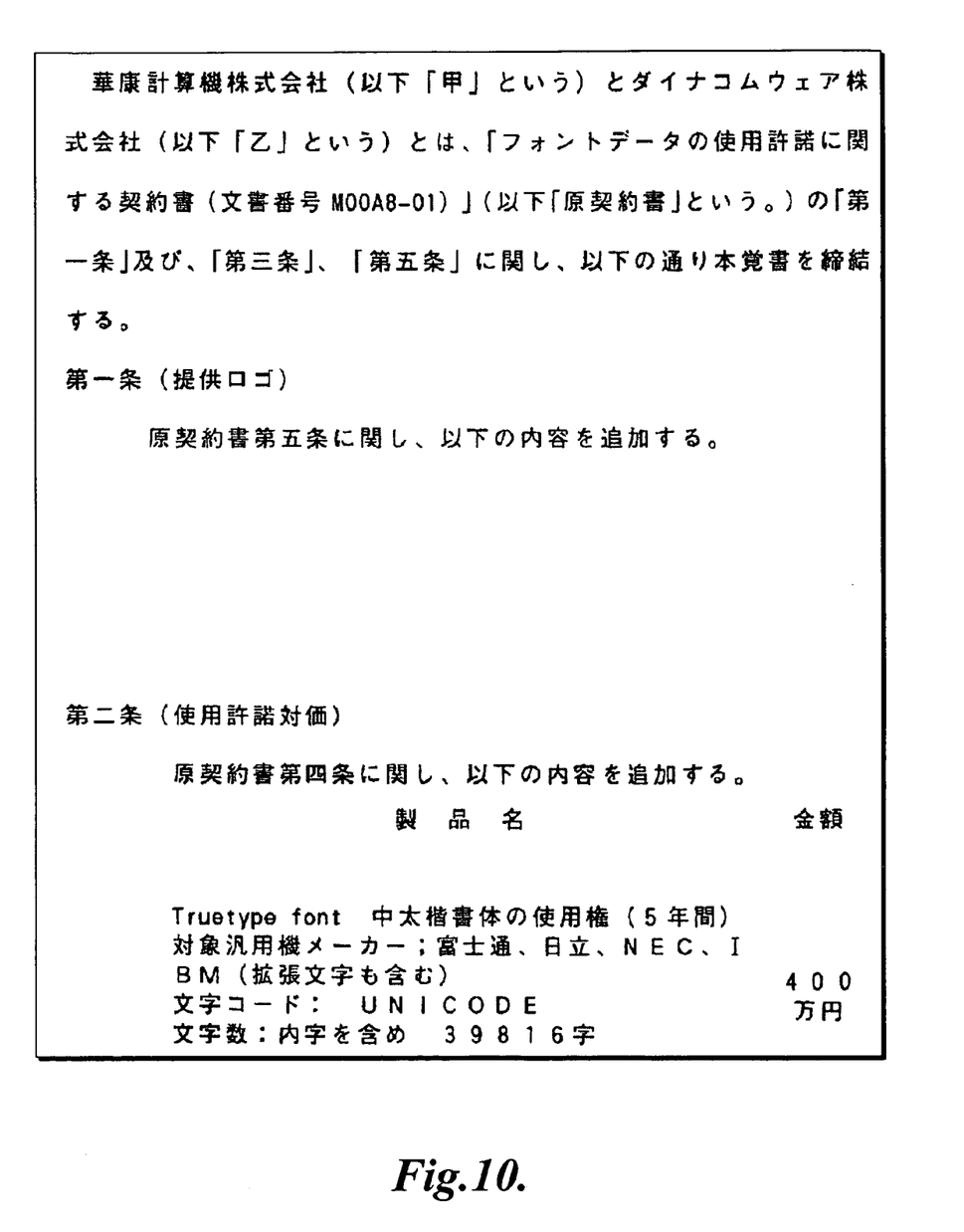
FIG. 10 is the sample Asian character document of FIG. 9 after imaging preprocessing has been performed to obtain only a text portion thereof.

FIG. 5 is a flowchart depicting a method of shuffling Asian character document image data in accordance with various exemplary embodiments of the present invention. In step S10, an Asian character document on paper 10 (for example, the document shown in FIG. 9) is scanned in by the image scanner 21 as an image. The scanned-in image includes a text portion consisting of Asian characters (including some western alphabet characters and numbers, as shown in FIG. 9) and a non-text portion including, for example, a logo 16 and a table frame 18. (The text inside the table frame 18 forms part of the text portion.) Thus, in step S20, a text portion is separated from a non-text portion in the scanned-in Asian document image, using suitable software as will be apparent to one skilled in the art. At this time, any desirable image preprocessing may also be performed, such as correction of any skew (due to the original Asian character document on paper 10 being fed into the image scanner 21 at an angle), noise removal (due to some smear or stain on the Asian character document on paper 10), and detecting and removing any underlining or table framing. Such image preprocessing can be carried out using various functions found in conventional OCR software, for example. FIG. 10 shows only the text portion of the scanned-in Asian character document image of FIG. 9 after the image undergoes step S20 and various other image preprocessing.

Figure 7A:
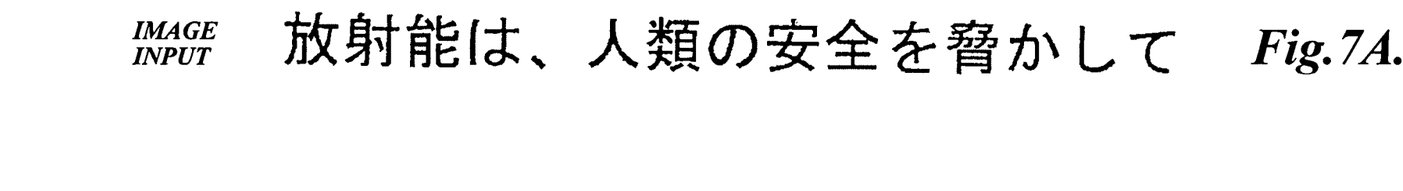
FIGS. 7A-7F schematically illustrate a method of constructing a multiple resolution-level pyramid structure in accordance with one embodiment of the present invention.
Figure 7B:
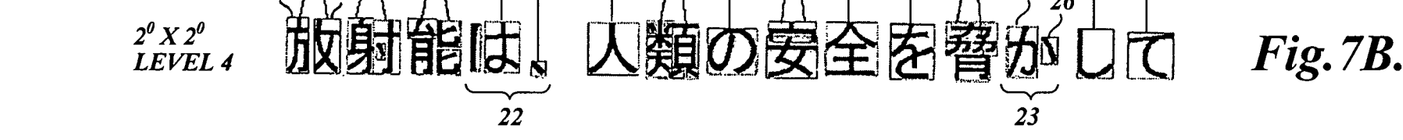
Figure 7C:
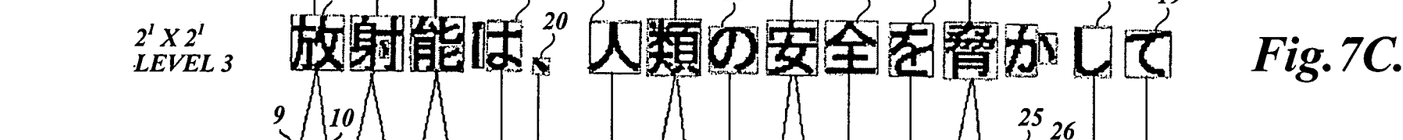
Figure 7D:
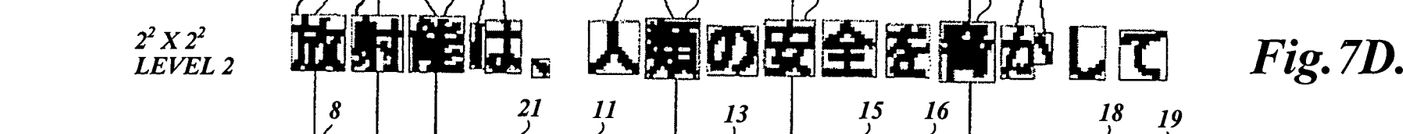
Figure 7E:
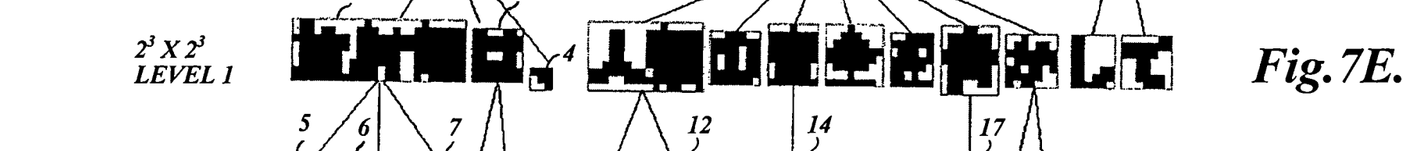
Figure 7F:
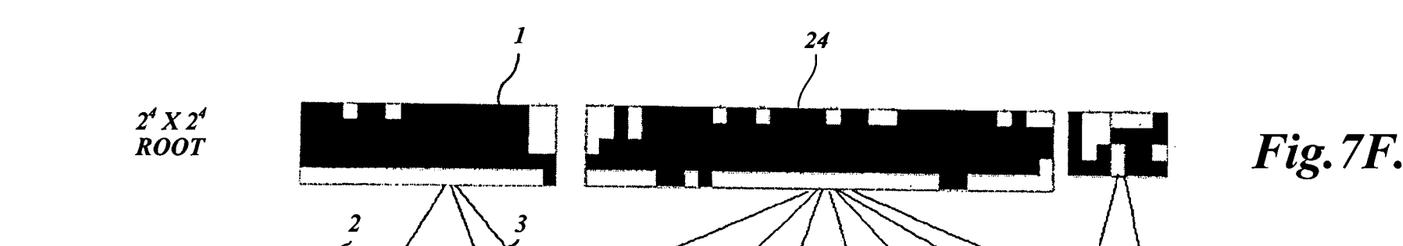

In step S30, a multiple resolution-level pyramid structure is constructed for the text portion image as obtained in step S20. This step is performed so as to extract each Asian character from the text portion image without erroneously extracting two or more glyphs forming each Asian character as two or more "characters" for shuffling purposes, as discussed above. As such, this step is important for the purpose of shuffling only genuine characters such that the shuffled image still contains recognizable characters, even though the order in which the characters are arranged is changed and thus the meaning of the sentences is lost. In step S30, the image resolution level of the scanned-in text portion image is progressively lowered, with the thickness of a line forming each character becoming progressively increased, as shown in FIGS. 7A-7F. FIG. 7A illustrates an input image of an Asian sentence line, whose image resolution level is lowered from the original $2^0 \times 2^0$ level (FIG. 7B), to $2^1 \times 2^1$ level (FIG. 7C), to $2^2 \times 2^2$ level (FIG. 7D), to $2^3 \times 2^3$ level (FIG. 7E), and to $2^4 \times 2^4$ level (FIG. 7F). As used herein, "$2^K \times 2^K$" signifies the number of original pixels in relatively high resolution, which is represented by one pixel at a particular resolution level, as will be more fully described below in reference to FIG. 8. At each resolution level, an island is found for each connected component, as shown in FIGS. 7B-7F. In the present application, the term "island" is used interchangeably with the term "bounding box" as used in reference to FIGS. 1-3. In FIG. 1, two bounding boxes (i.e., islands) 1 and 2 are found; in FIG. 2, two bounding boxes (or islands) 3 and 4 are found (with the island 3 completely included in the island 4); and in FIG. 3, only one island 5' is found. Each island may be defined, for example, with the coordinates of two diagonal corner points.

Figure 6:
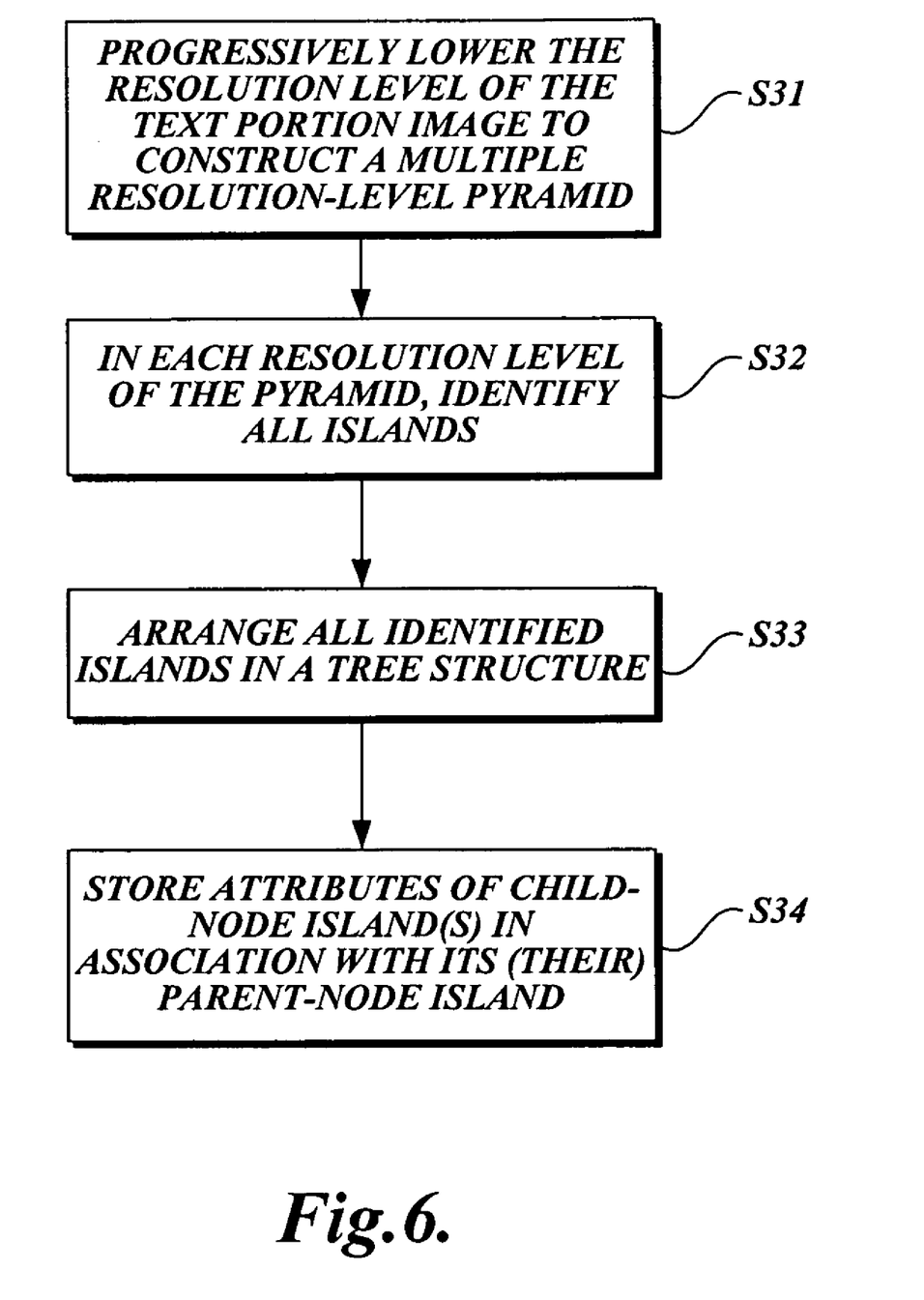
Figure 8:
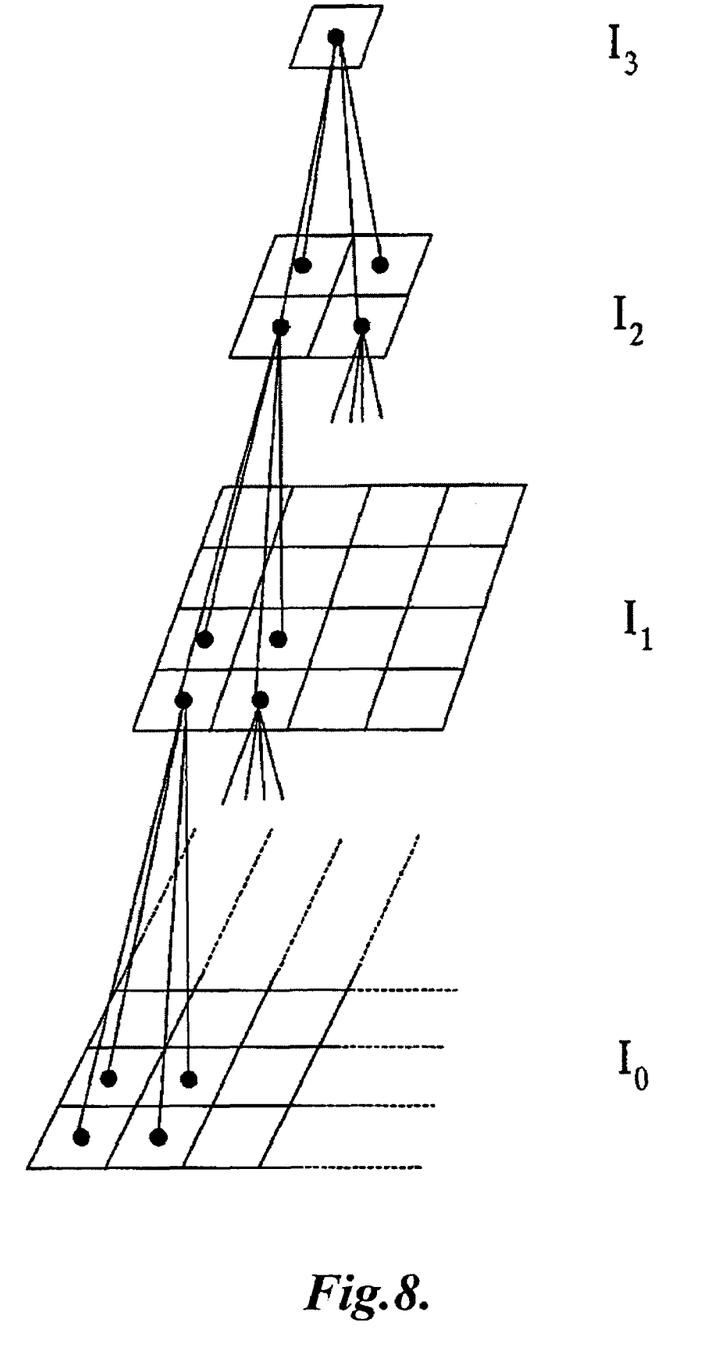
FIG. 8 schematically illustrates a method of progressively lowering the resolution level of an image so as to construct a multiple resolution-level pyramid structure in accordance with one embodiment of the present invention.

FIG. 6 is a flow chart illustrating detailed steps to be performed in step S30 of FIG. 5. In step S31, the image resolution level of the scanned-in text portion image is progressively lowered to thereby construct a multiple resolution-level pyramid structure. In one example, the multiple resolution-level pyramid structure may be constructed in five levels as shown in FIGS. 7B-7F, though in other applications more or less number of resolution levels may be sufficient or required. The pyramid structure for an original image having $2^K \times 2^K$ pixels would consist of (K+1) number of images, which have different resolution levels, respectively, ranging from $2^0 \times 2^0$ to $2^K \times 2^K$. FIG. 8 illustrates the relationship between these (K+1) number of images, wherein $I_0$ represents an image at $2^0 \times 2^0$ resolution level, $I_1$ represents an image at $2^1 \times 2^1$ resolution level, $I_2$ represents an image at $2^2 \times 2^2$ resolution level, and $I_3$ represents an image at $2^3 \times 2^3$ level. As noted above, "$2^K \times 2^K$" signifies the number of original pixels represented by one pixel at each resolution level. In other words, starting with $I_0$, the numbers of pixels along X and Y axes, respectively, are halved so that if $I_0$ at $2^0 \times 2^0$ resolution level has 64 pixels, $I_1$ at $2^1 \times 2^1$ resolution level has 16 pixels, $I_2$ at $2^2 \times 2^2$ resolution level has 4 pixels, and $I_3$ at $2^3 \times 2^3$ resolution level has 1 pixel. As the number of pixels used to represent the original image having a specific size decreases (i.e., as the size of the pixel increases), the resolution level of the image is lowered. Other methods of progressively lowering the resolution of an original image may also be used, as will be apparent to one skilled in the art.

Referring back to FIG. 6, in step S32, in each resolution level in the constructed pyramid structure, all the islands each containing a connected component are found, as in FIGS. 7B-7F.

In step S33, a tree structure is formed to represent the relationship between the islands at different resolution levels. Referring to FIGS. 7B-7F, as the resolution level is lowered, previously adjacent glyphs (and also characters) may touch or merge with each other so as to have previously adjacent islands merge into one island. As such, the islands found at $2^K \times 2^K$ level necessarily include all the islands found at $2^{(K-1)} \times 2^{(K-1)}$ level. For example, island 1 at the root level of FIG. 7F includes islands 2, 3, and 4 of level 1 of FIG. 7E, and island 2 in level 1 of FIG. 7E in turn includes islands 5, 6, and 7 of level 2 of FIG. 7D. In this example, island 1 in the root level of FIG. 7F becomes a root node, from which islands 2, 3, and 4 in level 1 of FIG. 7E depend as "child" nodes of island 1. In turn, island 2 at level 1 of FIG. 7E becomes a "parent" node with respect to islands 5, 6, and 7 of level 2 of FIG. 7D (i.e., islands 5, 6, and 7 become "child" nodes of island 2).

In step S34, in association with each "parent" node, attributes (the position and size, as represented by the coordinates of two diagonal corner points for example) of its one or more "child" node(s) are stored. For example, in FIGS. 7B-7F, the attributes of islands 9 and 10 at level 4 of FIG. 7B are stored in association with island 8 at level 3 of FIG. 7C. Thus, the computer is aware that island 8 consists of islands 9 and 10.

Referring back to FIG. 5, in step S40, the multiple resolution-level pyramid structure or, more specifically, the tree structure constructed as in FIG. 6 in which attributes of child-node island(s) are stored with its (or their) parent-node island, is analyzed to extract "shuffleable" islands, i.e., islands that represent actual Asian characters (as opposed to mere glyphs, or a combination of a character and a glyph from an adjacent character, for example).

In one embodiment, traversing from a higher resolution level to a lower resolution level, if a parent-node island includes only one child-node island, which is greater than a predefined minimum size for an island to qualify as a character, then such a parent-node island may be extracted as a shuffleable island. For example, referring to FIGS. 7B-7F, islands 5, 6, 7, 11, 12, 13, 14, 15, 16, 17, 18, and 19 may all be identified as shuffleable islands because they each contain only one child-node island. Islands that do not meet the minimum size requirement, such as island 20 that bounds a comma and island 21 that bounds a glyph of a character 22, are not extracted as shuffleable islands even when their parent-node island includes only one child-node island. In this method, the character 22 and the comma 20 cannot be extracted until island 1 in the root level of FIG. 7F is analyzed. At this time, islands 5, 6, and 7 at level 2 of FIG. 7D have already been extracted as shuffleable islands. Thus, island 1 at the root level of FIG. 7F is assumed to include shuffleable islands 5, 6, and 7, plus an unknown island which may or may not be shuffleable. In this example, the unknown island consists of the character 22 and the comma 20, but for the purpose of shuffling, the combination of the character 22 and the comma 20 can be treated as a shuffleable island. Likewise, a character 23 cannot be extracted until a parent-node island 24 at the root level of FIG. 7F is analyzed. At this time, islands 11, 12, 13, 14, 15, 16, and 17 have already been extracted as shuffleable islands. Thus, island 24 at the root level of FIG. 7F is assumed to include these shuffleable islands 11, 12, 13, 14, 15, 16, and 17, plus an unknown island that may or may not be shuffleable. In this example, the unknown island consists of the character 23, and for the purpose of shuffling the document image, the unknown island (in fact properly containing the single character 23) is treated as a shuffleable island.

Referring back to FIG. 5, in step S50, some or all of the extracted shuffleable islands are randomly selected and shuffled. Various methods of shuffling are possible, as would be obvious to one skilled in the art. In one shuffling method, first, multiple holding spaces are created in computer memory for holding the islands (or character images) to be shuffled.

Figure 11:
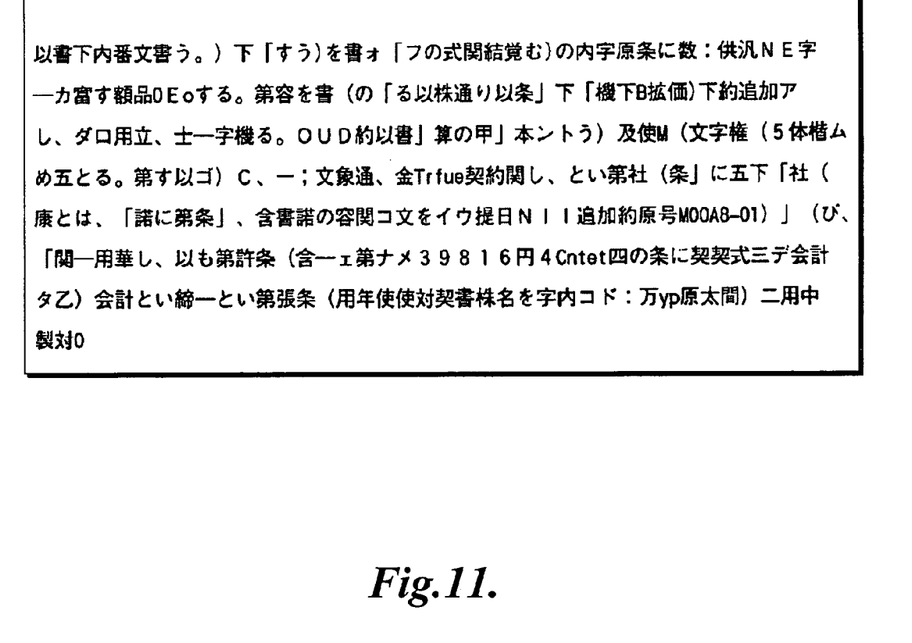
FIG. 11 is the sample Asian character document of FIG. 10 after it has been shuffled and thus become unreadable as text, with each of its characters being still recognizable as such, according to a method of the present invention.

Second, the islands to be shuffled are selected randomly from the extracted shuffleable islands and placed into the holding spaces. At this point, the actual islands (or character images) to be shuffled should be the islands (or character images) represented at the original image resolution level. For example, referring to FIGS. 7B-7F, though the character 23 is extracted as a shuffleable island at the root level of FIG. 7F, the actual island (or character image) to be shuffled is taken at the original image resolution level of FIG. 7B, which can be found by traversing the tree structure down from the resolution level of FIG. 7F. Thus, in this example, the attributes (e.g., the size and location) of the actual island to be shuffled consist of attributes of the two glyphs 25 and 26 forming the character 23 at level 4 of FIG. 7B, and what is actually shuffled will be a combination of the images of the glyphs 25 and 26 at level 4 of FIG. 7B. Maintaining the attributes of the islands at the original resolution level is also necessary so that any shuffled islands (or character images) can be thereafter reshuffled back to the original positions. FIG. 11 is the sample text portion of the Asian character document of FIG. 10, after it has been shuffled and thus become unreadable as text, though each of its characters is still recognizable as such.

Referring back to FIG. 5, steps S10 through S50 described above are directed to shuffling an Asian character document image. The shuffled Asian character document image data can then be sent to a third party computer 40 for conversion into text data (followed by manual verification and correction of text erroneously recognized by OCR software), or may be sent to an authorized receiver computer 50 for reshuffling (i.e., decoding), as previously described in reference to FIG. 4. When the shuffled text data are returned from the third party computer 40 to the original computer 22, the returned text data need to be reshuffled. Also, at the authorized receiver computer 50, the shuffled Asian document image data need to be reshuffled. Thus, in FIG. 5, step S60, reshuffling is performed, i.e., the shuffled islands are returned to their original positions based on the attributes (e.g., the location and size) of the islands at the original resolution level as previously stored. Finally in step S70, the reshuffled text portion image is combined with the non-text portion image to thereby restore the original Asian document image.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An Asian character document shuffling method for randomly relocating text character images of a scanned-in Asian character document to produce a shuffled image, wherein the meaning of text in the shuffled image is not understandable though individual characters contained in the text in the shuffled image are recognizable, the method comprising:
   (a) dividing an Asian character document image into a text image portion and a non-text image portion;
   (b) structuring the text image portion into a multiple resolution-level pyramid having multiple resolution levels that are progressively lower than the resolution level of the text image portion, the text image portion being presented in progressively lower resolution in each of the multiple resolution levels, step (b) further comprising sub-steps of:
      (i) forming a multiple resolution-level pyramid having resolution levels ranging from $2^0 \times 2^0$ to $2^N \times 2^N$ where N is a positive integer and where resolution level $2^0 \times 2^0$ is the resolution level of the original text image portion and the number of pixels along X and Y axes, respectively, in an image at a resolution level of $2^K \times 2^K$ is halved compared to the number of pixels along X and Y axes, respectively, in an image at a resolution level of $2^{K-1} \times 2^{K-1}$ where $N \geq K > 1$;
      (ii) finding all islands at each resolution level, wherein an island is a bounding box including a connected component; and
      (iii) constructing a tree structure representing a nodal relationship between islands of adjacent resolution levels;
   (c) extracting shuffleable character images by analyzing the multiple-resolution-level pyramid; and
   (d) shuffling some or all of the extracted shuffleable character images to create a shuffled image, step (d) further comprising sub-steps of:
      (i) creating a plurality of holding spaces;
      (ii) randomly selecting the extracted shuffleable character images and placing them in the holding spaces; and
      (iii) associating each shuffleable character image with attributes of island(s) forming the shuffleable character at the resolution level of $2^0 \times 2^0$,
   wherein the above steps are performed using a computer.

2. The method of claim 1, further comprising the steps of:
   decoding the shuffled image back to the text image portion of the Asian character document image; and
   combining the text image portion that has been decoded with the non-text image portion to restore the Asian character document image.

3. The method of claim 1, wherein the step of dividing an Asian character document image into a text image portion and a non-text image portion further comprises performing one or more sub-steps of skew correction, noise removal, and non-character image finding.

4. The method of claim 1, further comprising the step of decoding the shuffled image back to the text image portion of the Asian character document image by using the attributes of the island(s) forming the shuffleable character at the resolution level of $2^0 \times 2^0$.

5. A computer-readable medium comprising computer-executable instructions for shuffling an Asian character document image to change its appearance so that the meaning of a resulting shuffled document image cannot be understood while individual characters contained in the shuffled document are recognizable, the instructions when loaded into a computer causing the computer to execute the steps of:
   (a) structuring a text portion of an Asian character document image into a multiple resolution-level pyramid having multiple resolution levels that are progressively lower than the resolution level of the text image portion, the text image portion being presented in progressively lower resolution in each of the multiple resolution levels, step (a) further comprising sub-steps of:
      (i) forming a multiple resolution-level pyramid having resolution levels ranging from $2^0 \times 2^0$ to $2^N \times 2^N$ where N is a positive integer and where resolution level $2^0 \times 2^0$ is the resolution level of the original text image portion and the number of pixels along X and Y axes, respectively, in an image at a resolution level of $2^K \times 2^K$ is halved compared to the number of pixels along X and Y axes, respectively, in an image at a resolution level of $2^{K-1} \times 2^{K-1}$ where $N \geq K > 1$;
      (ii) finding all islands at each resolution level, wherein an island is a bounding box including a connected component; and (iii) constructing a tree structure representing a nodal relationship between islands of adjacent resolution levels;
(b) extracting shuffleable character images by analyzing the multiple-resolution-level pyramid; and
(c) shuffling some or all of the extracted shuffleable character images to create a shuffled image, step (c) further comprising sub-steps of:
  (i) creating a plurality of holding spaces;
  (ii) randomly selecting the extracted shuffleable character images and placing them in the holding spaces; and
  (iii) associating each shuffleable character image with attributes of island(s) forming the shuffleable character at the resolution level of $2^0 \times 2^0$.

6. The medium of claim 5, further comprising computer-executable instructions which, when loaded into a computer, cause the computer to execute the step of:
  decoding the shuffled image back to the text image portion of the Asian character document image.

7. The medium of claim 5, further comprising computer-executable instructions which, when loaded into a computer, cause the computer to execute the step of decoding the shuffled image back to the text image portion of the Asian character document image by using the attributes of the island(s) forming the shuffleable character at the resolution level of $2^0 \times 2^0$.

* * * * *

UNITED STATES PATENT AND TRADEMARK OFFICE
CERTIFICATE OF CORRECTION

PATENT NO.       : 7,596,270 B2                                      Page 1 of 1
APPLICATION NO.  : 11/234709
DATED            : September 29, 2009
INVENTOR(S)      : Kuo-Young Cheng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-eighth Day of September, 2010

David J. Kappos
*Director of the United States Patent and Trademark Office*